United States Patent [19]

Swindle

[11] 4,284,062
[45] Aug. 18, 1981

[54] SOLAR COLLECTOR SYSTEM

[76] Inventor: Elro M. Swindle, P.O. Box 628, Millbrook, Ala. 36054

[21] Appl. No.: 955,600

[22] Filed: Oct. 30, 1978

[51] Int. Cl.³ .............................................. F24J 3/02
[52] U.S. Cl. ................................. 126/423; 126/419; 126/437; 137/466
[58] Field of Search ....................................... 417/2–5; 137/466, 7; 165/107; 237/80; 126/420, 422, 423, 450, 452, 432, 433, 400, 437

[56] References Cited

U.S. PATENT DOCUMENTS

| | | | |
|---|---|---|---|
| 3,357,359 | 12/1967 | Schaub | 137/567 |
| 4,027,821 | 6/1977 | Hayes | 126/427 |
| 4,048,981 | 9/1977 | Hobbs | 126/432 |
| 4,054,124 | 10/1977 | Knoos | 126/422 |
| 4,108,374 | 8/1978 | Lyon | 126/400 |
| 4,170,222 | 10/1979 | Baker | 126/420 |
| 4,184,635 | 1/1980 | Bloomfield | 126/437 |

Primary Examiner—Albert W. Davis
Assistant Examiner—G. Anderson
Attorney, Agent, or Firm—LeBlanc, Nolan, Shur & Nies

[57] ABSTRACT

A solar collector system wherein water is continuously circulated between collector units and a reservoir and the conduits between the reservoir and the collector units are free of valves and like restrictions for enabling full drainage of the system when water is not being pumped through the system. Circulation is established by an initially operating large capacity pump to charge the system with water, and a small capacity pump takes over the maintain circulation after the system is charged, pump operation being controlled by the temperature of water in the system heated by the sun.

6 Claims, 3 Drawing Figures

SOLAR COLLECTOR SYSTEM

This invention relates to solar collector systems and particularly to relatively uncomplicated efficient easy to build and operate systems of the type that use water as a heat transfer fluid and provide for automatic positive fail-safe draining to prevent freeze damage to the collectors. The invention is readily adaptable to all commercial and residential solar collecting systems using water as a heat transfer fluid. The system is simple, straight-forward and fool-proof; and other systems, not using water as a transfer fluid, could be modified readily and converted to the more efficient and much less costly water system of the invention.

Solar collector systems are known wherein water is pumped upwardly to a group of collector units located to be exposed to the energy of the sun and the warmed water returned to a reservoir or other storage tank. All of these prior systems faced the problem of efficient drain-down when the system is not in operation, as during cloudy days or nights in freezing weather.

Proposed prior systems are mainly relatively complex in that many require expensive valves and sophisticated automatic controls that could fail and result in interference with draining of the collector units which might then freeze. Moreover, many of them provide continual water circulation during the entire period of operation by means of a pump that must have at least a large enough capacity to overcome the head between the collectors which may be on a building roof and a lower reservoir which may be in the building basement. This requires considerable electrical energy.

In some prior systems a vent is provided at the highest point in the water system. This vent is held closed by pump pressure in the system and when pump pressure is relieved the vent opens allowing the system to drain. In these systems the vent often does not reliably operate, for example condensation may freeze it tight, and the air drawn in the vent contains atmospheric pollutants which may soon contaminate the water in the system and may damage it as by causing corrosion.

In many proposed prior systems, valve arrangements some having quite sophisticated controls are provided for the drain down action. Besides being expensive to install and maintain these valves are subject to wear and the controls may fail, resulting in no or inadequate drainage and freeze damage to the collectors. These systems are more complex and expensive to maintain, and it is difficult to locate a failed part so that expert maintenance is required. The foregoing factors, coupled with high expenses, have discourage many potential users of solar energy, which means they use fossil fuel and other scarce or diminishing sources of energy.

The system of the invention about to be disclosed requires a minimum of electrical pumping energy, and is absolutely reliable in that all the water will drain from the collector units since there are no valves, no moving parts, nor any sophisticated controls required to bring about the drainage mode.

Not only is the system reliable and trouble-free, it would save more energy than known systems for several reasons: (1) More solar installations would result because of system simplicity and less cost than other drain down systems, (2) less pumping energy is required and (3) there would be conversions of existing solar collecting systems using costly anti-freeze or oil and associated heat exchangers. This is because water systems are inherently much more efficient in transferring heat and the conversion would eliminate the losses associated with a heat exchanger which is not required with water systems. Water is much less costly than anti-freeze or oil which must be replaced periodically. Specific performance of water collecting systems is at least twenty percent better than systems of any other transfer medium including anti-freeze, oils (silicone oils), or air. Thus converted systems would perform better and would result in more electric or other utility heat energy saved.

PREFERRED EMBODIMENTS

Figure 1:
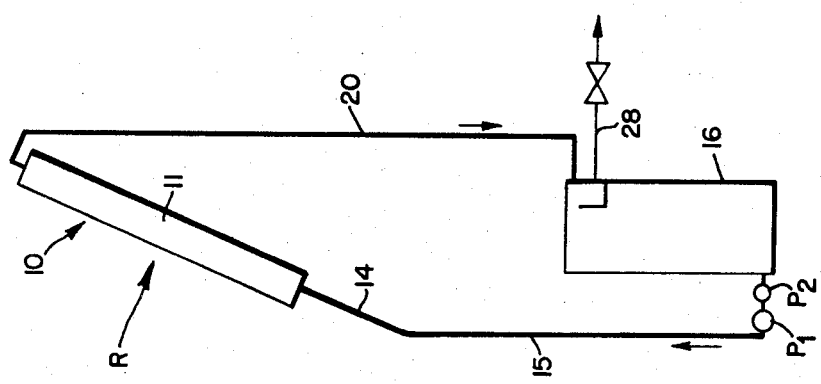
FIG. 1 is a diagrammatic side view showing components of a solar heat collector system according to a preferred embodiment.

A solar collector group 10 of solar collector units 11 are supported in a row or rows upon a roof or any frame (not shown) oriented for optimum exposure to the sun's rays R. As shown in FIG. 1 the solar collector group may be disposed at a suitable angle such as a roof pitch angle and usually in the range of about 30°-60° to the vertical.

Figure 2:
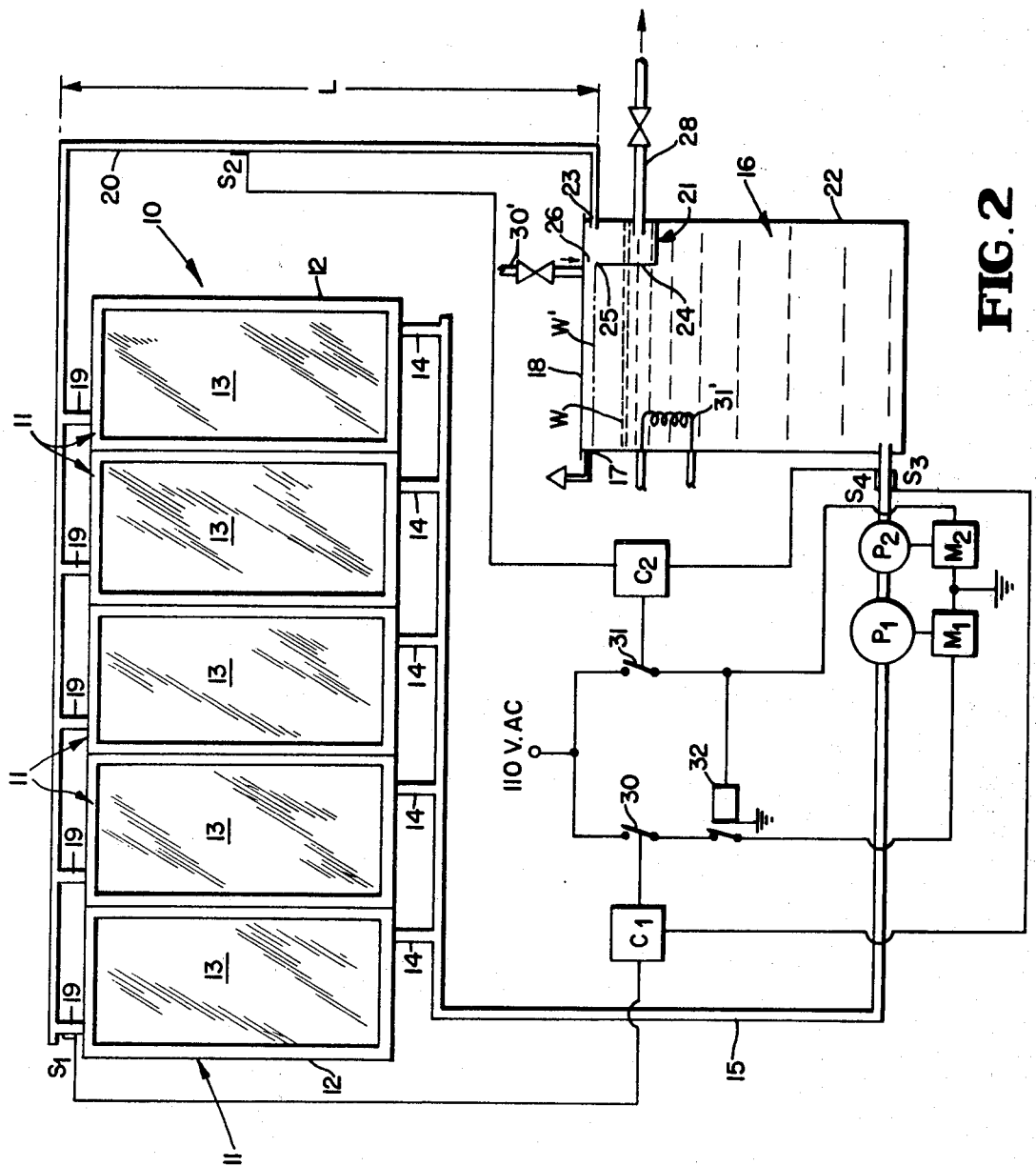
FIG. 2 is a generally diagrammatic view showing the components of the system in the condition at start-up or after drainage down.
Figure 3:
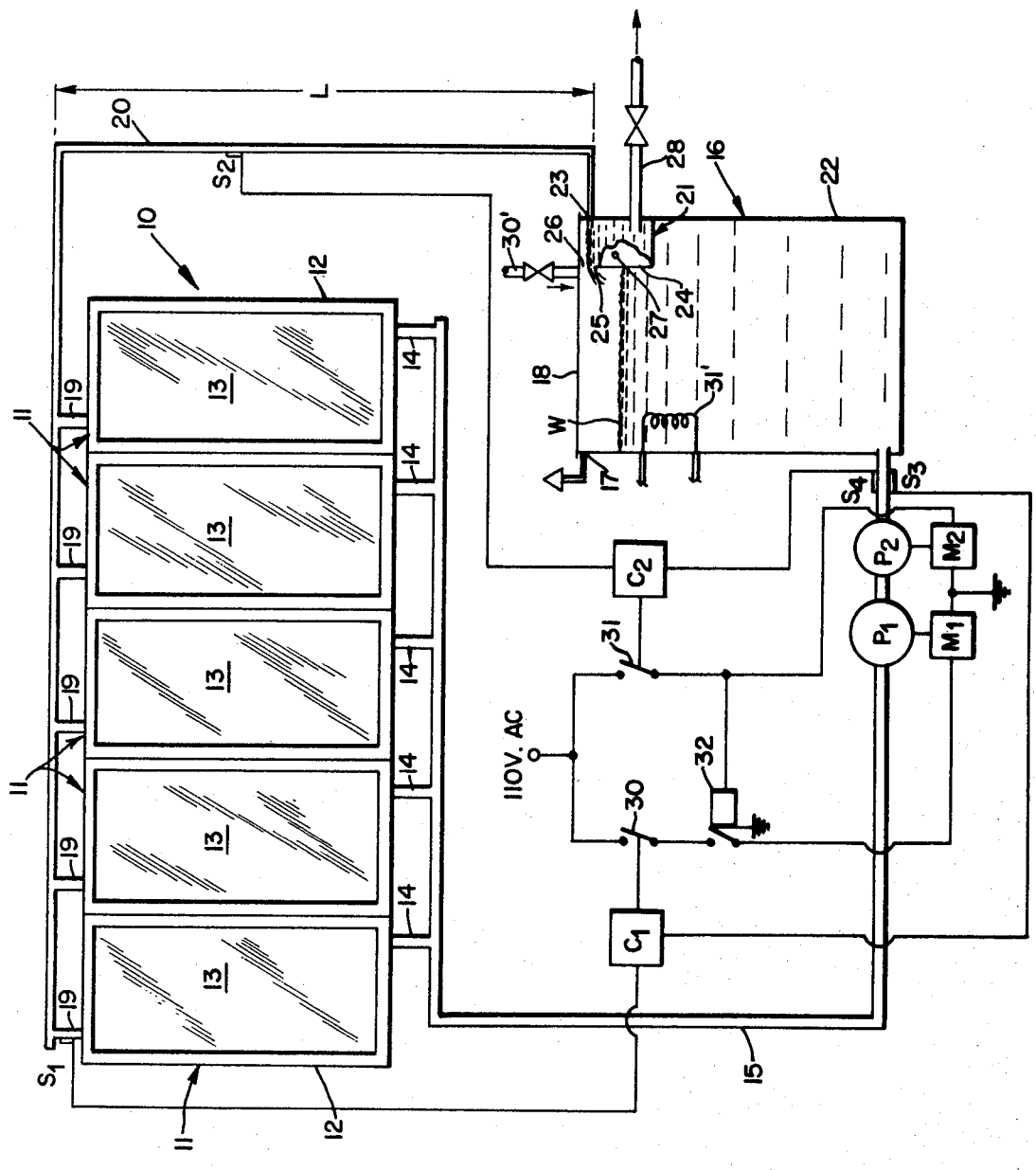
FIG. 3 is a generally diagrammatic view similar to FIG. 2 showing the components of the system in the operating heat transfer condition.

As shown in FIGS. 2 and 3 each collector unit 11 may be conventionally a hollow housing 12 having heat insulating walls except for providing for direct exposure to the sun of a contained body of water, or other equivalent heat absorbing liquid, through a smooth transparent window or panel 13. The material of panels 13 is a glass or plastic selected for maximum heat transmission and durability.

The interiors of units 11 are connected by lower end passages 14 to a common main feed conduit 15 that contains in series a large capacity pump assembly $P_1$ and a smaller capacity pump assembly $P_2$. In a desirable system the capacity of $P_1$ is considerably greater than $P_2$, usually several times as great. Both pumps are of the type that freely allow passage of water therethrough when they are not driven, or they may each have a bypass effective when idle.

As shown, feed conduit 15 is connected into the lower end of a suitable capacity liquid reservoir 16 which is disposed at a considerably lower level than the collector group 10, for gravity flow to and storage of liquid during certain phases of operation as will appear.

Preferably reservoir 16 is a ground level closed tank having a side wall vent 17 near the top wall 18 and above the normal high water level therein, as shown.

Individual conduits 19 connect the interiors of units 11 to a common return line 20 that descends to enter reservoir 16 at a port 23 just below the top wall. The maximum gravity head is indicated at L. Return line 20 is preferably of smaller diameter than the feed line 15 for a purpose to appear.

In the foregoing system all of the pipe connections, that is the conduits 15 and 20 and the various connections to the collector units and the reservoir, are airtight. It is preferable that conduits 15 and 20 and passages 14 and 19 be insulated to prevent loss of heat. The feed line 15 should be about one size larger than the return line 20 to assure a good siphon action during the draining phase as will appear. It is preferred in the invention that all conduits from the pumps to the highest point in the system must slope continuously upward as indicated in FIG. 1, and that all lines from the highest point in the system slope continuously down to the reservoir. This prevents water traps and possible freezing with attendant burst pipes. There are no valves either in the water supply line to the collector units or in the return line to the reservoir.

In a typical building installation such would have the collector units mounted on the roof facing the sun, and the reservoir, the pumps and the lower portions of conduits 15 and 20 protectively disposed within a lower part of the building.

As shown the reservoir has internal wall structure 21 defining a catch basin of materially less volume than the reservoir at a side wall 22 just under top wall 18. Return line 20 opens through port 23 into the catch basin which may have a capacity of about a gallon.

The inner wall 24 of the catch basin has its upper edge 25 spaced a small amount from reservoir top wall 18 to define a weir whereby liquid from the catch basin may overflow through space 26 into the main body of liquid in the reservoir. The wall of the catch basin is provided with one or more small weep openings as indicated at 27 in FIG. 3 located at about the normal water level for a purpose to appear. An outlet conduit 28 is connected into the catch basin below the level of opening 27.

A heat sensitive device $S_1$ is located at substantially the highest point in the system as indicated. This device which is heated by the sun and ambient air measures the temperature to which the collector units are exposed. A heat sensitive device $S_2$ is included in or on return line 20, and this measures the temperature of the water being withdrawn from the collector units and flowing to the reservoir. Separate heat sensitive devices $S_3$ and $S_4$ are placed where feed conduit 15 enters the bottom of the reservoir, and they measure the water temperature at that point in conduit 15. While devices $S_3$ and $S_4$ are shown as separate units, principally for clarity of disclosure, they may be combined into a single unit.

As shown the heat sensitive devices $S_1$ and $S_3$ are connected into a control device $C_1$ which may for example be a voltage comparator wherein generated signal voltages proportional to the temperatures measured at $S_1$ and $S_3$ are compared, and control device $C_1$ is connected to actuate a normally open switch 30 in the electrical control circuit for motor $M_1$ that drives large capacity pump $P_1$.

Similarly the heat sensitive devices $S_2$ and $S_4$ are connected into a control device $C_2$, which may be for example a voltage comparator wherein signal voltages proportional to the temperatures measured at $S_2$ and $S_4$ are compared, and control device $C_2$ is connected to actuate a normally open switch 31 in the electrical control circuit for motor $M_2$ that drives small capacity pump $P_2$. Also as shown whenever current is flowing in the circuit for pump $P_2$ a relay 32 acts to open the electrical circuit for pump $P_1$.

In operation assume the starting condition wherein the system contains water only in reservoir 16, and both switches 30 and 31 are open so that both pumps are idle. At this time $S_3$ is furnishing a fairly steady signal voltage to $C_1$ that is proportional to the temperature of water at the bottom of reservoir 16, probably about 50°-60° F. but $S_1$ being exposed to the ambient air is cooler than $S_3$ and furnishes no effective signal voltage to $C_1$.

The sun starts heating $S_1$ and when the rising temperature at $S_1$ becomes a predetermined amount greater than the temperature at $S_3$ a sufficient signal voltage is supplied from $S_1$ to $C_1$ which upon comparison with the signal voltage from $S_3$ causes actuation of $C_1$ to close switch 30. In a typical system the actuating temperature differential may be about 15°-20° F. Immediately large capacity pump $P_1$ is energized and starts pumping water from the reservoir up through line 15, overcoming the head L, purging the collector units 11 of air and filling them with water and establishing a continuous flow of water through line 15, collector units 11, return line 20 and the reservoir.

It will be noted that the water entering port 23 will first fill the catch basin 21 up to the level of weir 25 and will then overflow into the reservoir. The size of weep opening 27 is so relatively small that water cannot escape through opening 27 as fast as it enters port 23.

As water passes through units 11 it is heated by the sun's energy, and warmed water eventually flows in return line 20. Due to the fact that the warmed water returned to the reservoir is continuously recycled, and the circumstances that the heat energy from the sun usually rises during the early part of the day, the water in the entire system becomes gradually warmer.

The water in the upper part of reservoir 16 will be hotter than the water in the lower part where line 15 extracts it. Thus there is a temperature differential between the freshly heated water in line 20 measured at $S_2$ and the water entering line 15 measured at $S_4$.

The invention includes the important circumstance that when this temperature difference between $S_2$ and $S_4$ reaches a predetermined amount, the changing signal voltage from $S_2$ that is being compared in control device $C_2$ with the signal voltage from $S_4$ causes actuation of control device $C_2$ to close switch 31 which results in energization of the small capacity pump $P_2$ and operation of the relay 32 to open the circuit to the large capacity pump $P_1$. The actuating temperature difference here may be about 15° to 25° F.

When pump $P_2$ takes over, the system has become a closed hydraulic circuit already full of water, and so only a very small pumping force is required at $P_2$ to keep the water circulating through the system since only friction of flow need be overcome for maintaining continuous circulation. Thus pump $P_2$ is very much smaller than pump $P_1$ and there is a considerable reduction in energy requirements, resulting in lowered operating costs.

In a typical system according to the invention the relative sizes of the pumps $P_1$ and $P_2$ may be chosen with regard to the volume flow desired through the system, the lift distance L being a predominant factor, For example, where L is about fifty feet, $P_1$ could be a ¾ horsepower pump and $P_2$ a 1/12 horsepower pump. Similar in a case where L is about twenty five feet, $P_1$ could be a ¼ horsepower pump and $P_2$ a 1/12 horsepower pump.

As shown in the drawings valved utility conduit 28 may selectively extract water from the lower part of catch basin 21 which remains full as shown in FIG. 2 as long as pump $P_1$ continues to operate. Thus the invention makes available for use the water which is substantially hottest.

When the sun's energy becomes insufficient to retain the required temperature differential between $S_2$ and $S_4$, due to a decrease in the signal from $S_2$ control device $C_2$ acts to open switch 31 thereby deenergizing pump $P_2$ and stopping forced water circulation through the system. Typically the actuating temperature difference here may be in the order of 3° to 5° F. Usually this takes place late in the day as at sunset when the air temperature becomes correspondingly lower. At this point the system remains a closed hydraulic circuit for a small delay period during which water slowly leaves the catch basin 21 through weep hole 27 until the port 23 is uncovered as shown in FIG. 2. At this point and since both pumps allow through flow when idle air from the reservoir may enter return line 20 and all of the water in the collectors 11 immediately drains back down through line 15 into the reservoir. Thus the invention provides an automatic failsafe operation.

The small delay during which the catch basin drains slowly is effective to prevent intermittent draining and the necessity to recharge the system by reactivating the large capacity pump $P_1$ when there are only short periods of cloudiness to other temporary sunlight restrictions. Should the interruption in sunlight terminate before the port 23 is uncovered the water in line 20 will become promptly hot enough to restore the required temperature differential between $S_2$ and $S_4$ and the small capacity pump will resume circulation of water through the system.

In the instance that the temperature at $S_2$ should become low enough to deenergize control $C_2$, and then rise and activate a few minutes later such would take place while the system is full of hot water, that is not drained, and this hot water would start circulating again to resume normal operation. In the unlikely instance that $C_2$ would become energized after the system had drained pump $P_2$ will run harmlessly for a few minutes until the air temperature in conduit 20 drops sufficiently at $S_2$ to shut down pump $P_2$.

In this manner whenever the pumping stops for a predetermined period the collectors of the system automatically drains, so that the system is a true fail-safe system. Since the system operates in a closed loop little or no water is lost during normal operation. Should some water be drawn off as at 28 it can be replaced through a valved inlet line. Instead of drawing off water directly through line 28, domestic hot water may be provided through a heat exchange coil 31' connected to circulate externally of the reservoir.

SUMMARY OF AND ADVANTAGES OF THE INVENTION

1. There are no fluid control valves in the collector circuit. It is very simple and even the novice homeowner can trouble-shoot the system. The drain mode is thus absolutely trouble free.

2. When the collectors drain, they receive air from the reservoir air cavity, and are not subjected to atmospheric pollutants as with prior vented systems. The reservoir has a filtered vent to the atmosphere but in a controlled environment such as a basement in a building.

3. During most operative time the pumping power is minimum because the system is a closed hydraulic loop after start-up and charging. A small fractional horsepower motor at $P_2$ can easily circulate the water to overcome friction attendant to flow.

4. No maintenance is required to keep the drain-back operation functional.

5. Initial installation cost is much less than other systems because it is structurally simple.

6. The system would be more readily accepted by prospective solar heat customers who have become skeptical of the complicated valving and logic circuitry required in many existing systems.

7. The catch basin provides a very effective ancillary feature. The hottest water possible is available for utility since the basin is kept filled with heated water immediately out of the collectors. Water can be withdrawn from this basin for use in space heating and the like, This means hotter water can be used earlier and will have a marked effect on increasing the total efficiency of the overall system. When the collector system is not operating, the hottest water in the system is still available in the catch basin by the weep hole obtaining water from the top of the reservoir.

The catch basin has another advantage. It slows the inrushing water from the collector units to diminish mixing speed which aids in stratifacation of water temperature in the reservoirs. This is a highly desirable feature which increases system efficiency, and it helps establish the temperature differential between $S_2$ and $S_4$ that is effective on control device $C_2$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a solar collector system wherein solar collector units adapted to contain water to be heated by the sun are connected to a lower level reservoir by water feed and return conduit means that are free of valves and in substantially all respects incline downwardly from the collector units to the reservoir, pump means in the feed conduit means for continuously circulating water from the reservoir through the collector units and capable of substantially unrestrictedly passing water therethrough or thereby when idle, means responsive to the temperature of the water heated by the sun for controlling operation of said pump means including means whereby the pumping force of said pump means is automatically reduced a predetermined amount or stopped when there is a predetermined difference in temperature between water heated by the sun leaving said collector units and water entering said feed conduit means from said reservoir and means having no moving parts whatsoever, operable when said pump means is stopped, for venting said system to thereby permit water to drain from said collector units and said water feed and return conduit means into said reservoir, said venting means comprising a relatively small volume catch basin at said reservoir open to said return conduit means and adapted to overflow into said reservoir, said catch basin being filled to a level above the entrance of said return conduit means while said pump means are maintaining the closed water circuit, and weep hole means in the wall of said catch basin whereby when the pump means stop said catch basin drains into the reservoir only slowly to delay the water level in said catch basin from dropping below the entrance of said return conduit means whereupon, when water drops below said return conduit means entrance, said return conduit means is vented and subsequent draining of said collector units into said reservoir occurs.

2. In a solar collector system wherein solar collector units adapted to contain water to be heated by the sun are connected to a lower level reservoir by water feed and return conduit means that are free of valves and in substantially all respects incline downwardly from the collector units to the reservoir, pump means in the feed conduit means for continuously circulating water from the reservoir through the collector units and capable of substantially unrestrictedly passing water therethrough or thereby when idle, means responsive to the temperature of the water heated by the sun for controlling operation of said pump means, said pump means comprising respective large and small capacity pumps, and said means for controlling operation of the pump means comprising means for starting said large capacity pump for initially filling said collector units with water from the reservoir and establishing a closed water circuit in the system and means for subsequently automatically disabling the large capacity pump and activating the small capacity pump to maintain said continuous circulation of water in the system and means having no moving parts whatsoever, operable when said pump means are stopped, for venting said system to thereby permit water to drain from said collector units and said water feed and return conduit means into said reservoir, said venting means comprising a relatively small volume catch basin at said reservoir open to said return conduit means and adapted to overflow into said reservoir, said catch basin being filled to a level above the entrance of said return conduit means while said pumps are maintaining the closed water circuit, and weep hole means in the wall of said catch basin whereby when the small capacity pump stops said catch basin drains into the reservoir only slowly to delay the water level in said catch basin from dropping below the entrance of said return conduit means whereupon, when water drops below said return conduit means entrance, said return conduit means is vented and subsequent draining of said collector units into said reservoir occurs.

3. In a solar collector system wherein solar collector units adapted to contain water to be heated by the sun are connected to a reservoir by feed conduit means and return conduit means, relatively large and small capacity pumps in the feed conduit means, means for energizing said large capacity pump while the small capacity pump remains idle for drawing water from a reservoir to fill the collector units and establish a continuously flowing closed water circuit that includes said collector units, said reservoir and said conduit means, means responsive to a predetermined temperature rise in the water heated in said collector units for automatically disabling said large capacity pump and automatically energizing said small capacity pump to maintain continuous water flow in said water circuit, both said pumps being capable of substantially unrestrictedly passing water therethrough or thereby when idle, and means having no moving parts whatsoever operable when both said pumps are idle, for venting said system to thereby drain said collector units, feed conduit means and said return conduit means to said reservoir, said venting means comprising a relatively small volume catch basin at said reservoir open to said return conduit means and adapted to overflow into said reservoir, said catch basin being filled to a level above the entrance of said return conduit means while said pumps are maintaining the closed water circuit, and weep hole means in the wall of said catch basin whereby when the small capacity pump stops said catch basin drains into the reservoir only slowly to delay the water level in said catch basin from dropping below the entrance of said return conduit means whereupon, when water drops below said return conduit means entrance, said return conduit means is vented and subsequent draining of said collector units into said reservoir occurs.

4. In the solar collector system defined in claim 3, means responsive to a predetermined difference between the temperature of sensing means exposed to the suns rays at said collector units and the water temperature at said reservoir for initially energizing said large capacity pump.

5. In the solar collector system defined in claim 4, means responsive to a predetermined drop in temperature of the water in said return conduit means for disabling said small capacity pump and draining water from said collector units into said reservoir.

6. In the solar collector system defined in claim 5, means providing a predetermined time delay between the stopping of said small capacity pump and start of draining of water from the collector units.

* * * * *